United States Patent
Ueda et al.

(10) Patent No.: US 8,744,818 B2
(45) Date of Patent: Jun. 3, 2014

(54) THERMAL-FLUID-SIMULATION ANALYZING APPARATUS

(75) Inventors: Akira Ueda, Kawasaki (JP); Junichi Ishimine, Kawasaki (JP); Ikuro Nagamatsu, Kawasaki (JP); Masahiro Suzuki, Kawasaki (JP); Tadashi Katsui, Kawasaki (JP); Yuji Ohba, Kawasaki (JP); Seiichi Saito, Kawasaki (JP); Nobuyoshi Yamaoka, Kawasaki (JP); Yasushi Uraki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 679 days.

(21) Appl. No.: 12/805,591

(22) Filed: Aug. 6, 2010

(65) Prior Publication Data

US 2011/0060571 A1   Mar. 10, 2011

(30) Foreign Application Priority Data

Sep. 4, 2009   (JP) .................................. 2009-205326

(51) Int. Cl.
  *G06F 17/50* (2006.01)
  *H05K 7/20* (2006.01)
(52) U.S. Cl.
  CPC ............ *G06F 17/50* (2013.01); *G06F 2217/16* (2013.01); *G06F 2217/80* (2013.01); *H05K 7/20609* (2013.01); *H05K 7/20836* (2013.01)
  USPC .............. 703/6; 703/1; 703/2; 703/9; 703/10; 374/44; 374/134; 374/135
(58) Field of Classification Search
  None
  See application file for complete search history.

(56) References Cited

U.S. PATENT DOCUMENTS

| | | | | |
|---|---|---|---|---|
| 5,550,750 | A | * | 8/1996 | Wolff ........................... 716/112 |
| 5,819,070 | A | * | 10/1998 | Sasaki ............................ 703/13 |
| 5,844,564 | A | * | 12/1998 | Bennis et al. .................. 345/423 |
| 5,942,682 | A | * | 8/1999 | Ghetzler et al. ................ 73/147 |
| 6,069,971 | A | * | 5/2000 | Kanno et al. .................. 382/144 |
| 6,502,018 | B1 | * | 12/2002 | Bessler ....................... 701/31.9 |
| 7,031,870 | B2 | * | 4/2006 | Sharma et al. ............... 702/130 |
| 7,225,112 | B2 | * | 5/2007 | Uraki .............................. 703/2 |
| 7,372,460 | B2 | * | 5/2008 | Usami et al. .................. 345/419 |

(Continued)

FOREIGN PATENT DOCUMENTS

| | | |
|---|---|---|
| JP | 8-95672 | 4/1996 |
| JP | 2008-34715 | 2/2008 |

OTHER PUBLICATIONS

By M. H. Beitelmal, C. D. Patel, "Thermo-Fluids Provisioning of a High Performance High Density Data Center", pp. 227-238, 2006.*

(Continued)

*Primary Examiner* — Omar Fernandez Rivas
*Assistant Examiner* — Kibrom Gebresilassie
(74) *Attorney, Agent, or Firm* — Staas & Halsey LLP

(57) ABSTRACT

A thermal-fluid-simulation analyzing apparatus includes an execution unit that generates an analysis model using analysis conditions to conduct a first thermal fluid simulation analysis based on the generated analysis model, an analysis-condition collecting unit that collects analysis conditions when a pre-determined period passes after the first thermal fluid simulation analysis, a condition extracting unit that extracts a boundary condition from the analysis conditions collected by the analysis-condition collecting unit, and a re-execution unit that selects a region corresponding to the boundary condition extracted by the condition extracting unit from regions of the analysis model generated by the execution unit, updates the selected region with the boundary condition, and conducts a second thermal fluid simulation analysis for the updated analysis model.

7 Claims, 10 Drawing Sheets

(56) References Cited

U.S. PATENT DOCUMENTS

| | | | |
|---|---|---|---|
| 8,150,668 B2* | 4/2012 | Shapiro | 703/9 |
| 8,180,494 B2* | 5/2012 | Dawson et al. | 700/278 |
| 8,285,522 B1* | 10/2012 | Tryon et al. | 703/2 |
| 8,315,841 B2* | 11/2012 | Rasmussen et al. | 703/1 |
| 8,639,482 B2* | 1/2014 | Rasmussen et al. | 703/5 |
| 2004/0122635 A1* | 6/2004 | Uraki | 703/2 |
| 2008/0099569 A1* | 5/2008 | Plumpton et al. | 236/1 B |
| 2009/0119080 A1* | 5/2009 | Gray et al. | 703/8 |
| 2009/0138313 A1 | 5/2009 | Morgan et al. | |
| 2009/0150123 A1* | 6/2009 | Archibald et al. | 703/1 |
| 2009/0192770 A1* | 7/2009 | Ueda et al. | 703/6 |
| 2009/0193051 A1* | 7/2009 | Ueda et al. | 707/102 |
| 2009/0207564 A1* | 8/2009 | Campbell et al. | 361/688 |
| 2010/0010678 A1* | 1/2010 | Dawson et al. | 700/276 |
| 2010/0057259 A1* | 3/2010 | Dawson et al. | 700/278 |
| 2010/0082178 A1* | 4/2010 | Dawson et al. | 700/300 |
| 2010/0082309 A1* | 4/2010 | Dawson et al. | 703/6 |
| 2010/0110076 A1* | 5/2010 | Hao et al. | 345/440 |
| 2010/0204963 A1* | 8/2010 | Shapiro | 703/1 |
| 2010/0217454 A1* | 8/2010 | Spiers et al. | 700/300 |
| 2010/0286975 A1* | 11/2010 | Varon-Weinryb | 703/14 |
| 2010/0292976 A1* | 11/2010 | Newcombe et al. | 703/13 |
| 2011/0010151 A1* | 1/2011 | Archibald et al. | 703/5 |
| 2011/0016342 A1* | 1/2011 | Rowan et al. | 713/340 |
| 2012/0232877 A1* | 9/2012 | Bhagwat et al. | 703/13 |
| 2012/0271491 A1* | 10/2012 | Spata | 701/3 |
| 2013/0062047 A1* | 3/2013 | Vaney et al. | 165/287 |
| 2013/0073245 A1* | 3/2013 | Bhagwat et al. | 702/130 |
| 2013/0169816 A1* | 7/2013 | Hu et al. | 348/159 |
| 2013/0204593 A1* | 8/2013 | Doorhy et al. | 703/2 |

OTHER PUBLICATIONS

By M. H. Beitelmal, C. D. Patel, "Thermo-Fluids Provisioning of a High Performance High Density Data Center", pp. 1-19, 2004.*

M. H. Beitelmal, C. D. Patel, "thermo-Fluids Provisioning of a High Performance High Density Data Center" pp. 1-18, 2004.*

J. Rambo, & Y. Joshi "Modeling of data center airflow and heat transfer: State of the art and future trends", pp. 193-225, 2007.*

European Search Report for EP 10 17 4364, mailed Jul. 25, 2011.

Jeffrey Rambo et al., "Modeling of data center airflow and heat transfer: State of the art and future trends", Distrib. Parallel Databases, Jan. 19, 2007, pp. 193-225.

Abdlmonem H. Beitelmal et al., "Thermo-Fluids Provisioning of a High Performance High Density Data Center", Distributed and Parallel Databases, Apr. 22, 2006, pp. 227-238.

* cited by examiner

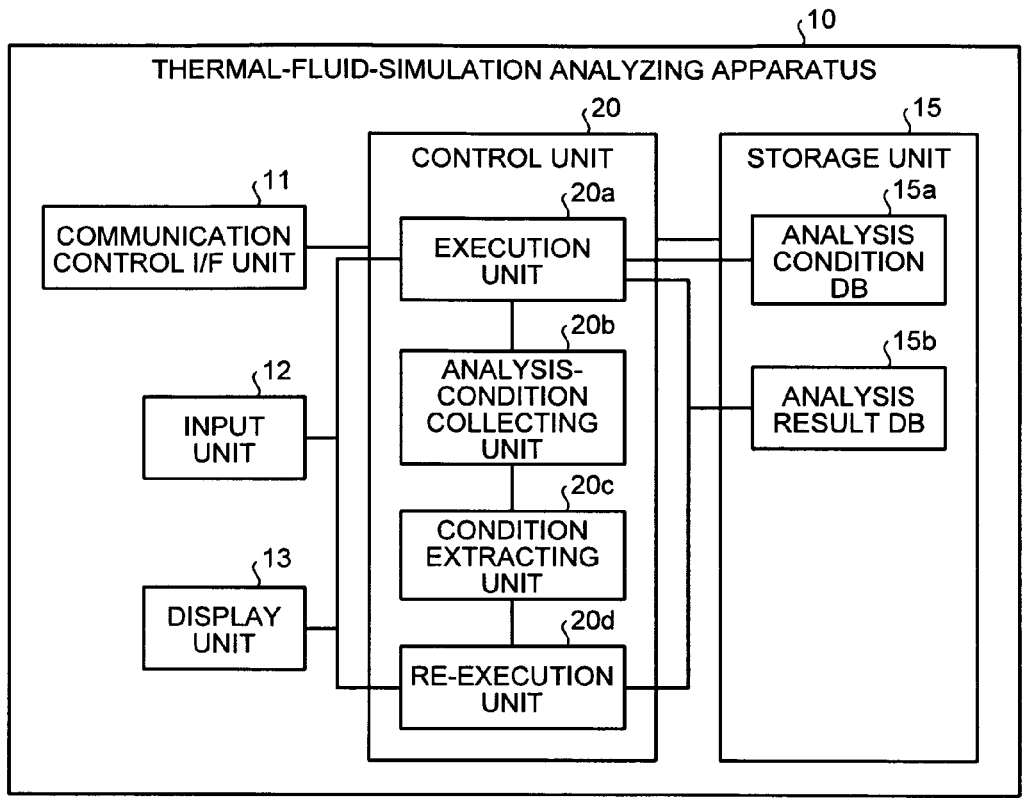

RACK DEVICE (SIDE VIEW)

AIR-INTAKE-SIDE TEMPERATURE SENSOR

AIR FLOW SENSOR

AIR FLOW

DATA CENTER

GRILLE  RACK DEVICE  AIR CONDITIONER

RE-DEFINED REGION

FIG.10

| ANALYSIS SETTING CONDITIONS | DEFAULT ANALYSIS | TEMPERATURE ALARM | | AIR FLOW ALARM | |
|---|---|---|---|---|---|
| | | AIR INTAKE SIDE OF RACK | AIR OUTLET SIDE OF RACK | GRILLE | AIR CONDITIONER |
| ·FLOOR INFORMATION (OUTER SHAPE AND HEIGHT) | O | | | | |
| ·ARRANGEMENT INFORMATION (RACKS, GRILLES, AND AIR CONDITIONERS) | O | | | O | |
| ·AMOUNTS OF RACK-GENERATED HEAT | O | | O | | |
| ·VOLUMES OF RACK EXHAUST-AIR | O | O | | | |
| ·GRILLE INFORMATION (GRILLE APERTURE RATIOS) | O | | | | |
| ·COOLING PERFORMANCES OF AIR CONDITIONERS | O | O | O | | |
| ·FLOW VOLUMES OF AIR CONDITIONERS | O | O | | O | O |

US 8,744,818 B2

THERMAL-FLUID-SIMULATION ANALYZING APPARATUS

CROSS-REFERENCE TO RELATED APPLICATION(S)

This application is based upon and claims the benefit of priority of the prior Japanese Patent Application No. 2009-205326, filed on Sep. 4, 2009, the entire contents of which are incorporated herein by reference.

FIELD

The embodiments discussed herein are directed to thermal-fluid-simulation analyzing apparatuses.

BACKGROUND

In data centers where there are information technology (IT) devices, such as computers, servers, and routers, accommodated in rack devices, heated air is taken out and cooling air is taken in using air conditioners so that the IT devices are cooled down.

In recent years, the temperature in the data centers tend to become high because the IT devices are closely arranged in rack devices and the consumed power of the data centers have increased. As a result, sometimes the IT devices are not cooled down sufficiently, which causes problems. When the temperature distribution in data centers is examined, it is known that the IT devices and the rack devices are arranged at different locations in different installation environments, and that the amount of heat generated by the central processing units (CPUs) in the IT devices varies, and the amount of heat generated by the rack devices varies. Therefore, some IT devices are not cooled down, and heated beyond a permissible temperature. Furthermore, such an increase in the temperature in a data center may cause a malfunction of the air conditioners that supply the cooling air; for example, abnormal operation or abnormal stop of the air conditioner may occur.

To predict the occurrence of such an abnormal condition, a sensor or the like is employed (see, for example, Japanese Laid-open Patent Publication No. 2008-034715, and Japanese Laid-open Patent Publication No. 08-095672). This prediction technique using a sensor or the like, however, takes a long time to rectify the problems. This is because this prediction technique using a sensor predicts an abnormal phenomenon, which would cause a problem, based on measurements at limited measurement points, and identifies and analyzes factors causing the abnormal condition and then formulate a countermeasure for the problem making full use of various types of thermal technologies and analysis technologies.

In view of this drawback, a technique utilizing thermal-fluid simulation is employed for predicting an abnormal phenomenon other than the above-described prediction technique utilizing the sensor. Specifically, when a temperature sensor, an air flow sensor, or the like detects abnormal temperature, abnormal air flow, or the like in the data center, various actions are taken: for example, the measurement data such as temperature data is analyzed for identifying the problem; the situation is assessed based on a simulation; and a countermeasure is taken.

For example, a simulator, which conducts a thermal fluid simulation, performs a series of processes to assess the situation based on a thermal-fluid simulation: for example, the simulator performs a series of processes for collecting an analysis conditions, formulating an analysis model, generating a mesh, executing calculations, and analyzing a result.

Each of these processes is described in detail below. The simulator first collects analysis conditions that include floor information, information about the arrangement of rack devices, grilles, and air conditioners, amounts of rack-generated heat, volumes of rack exhaust-air, grille aperture ratios, cooling performances of the air conditioners, and flow volumes of the air conditioners. The simulator obtains the analysis conditions from, for example, a database which is created by an administrator and which contains information about arrangement of devices inside the data center. The simulator then performs model shaping, heat-generating-condition setting, and air-flow setting, to generate an analysis model.

After that, the simulator divides the analysis model into meshes by transforming conservation equations (e.g., the Navier-Stokes equation) of the air flow and the thermal transfer in the data center into finite volumes. If the space to be analyzed is large or if a highly accurate simulation is needed, the number of meshes is increased and the number of calculations is increased.

After that, the simulator performs coupling so that one parameter of the conservation equation, e.g., the Navier-Stokes equation, depends on another parameter or a nearby value and then performs a finite iterative calculation repeatedly until the error of the conservation equation decreases to an allowable level, thereby causing the solutions to converge and thus solving the conservation equation. More specifically, the simulator causes the solutions of the Navier-Stokes equation to converge using a widely-known splitting method, for example, Semi-Implicit Method for Pressure Linked Equations (SIMPLE) algorism.

For example, after setting the default values in the conservation equation, the simulator calculates, using the conservation equation, both the flow velocity in the x axis of the mesh-divided space and the flow velocity in the y axis. The simulator then calculates the pressure in the mesh-divided space, updates the flow velocity and the density for the conservation equation, and calculates the temperature, for example, using another equation, e.g., the heat equation. The simulator determines whether an error between a threshold and a boundary value that is determined according to the calculated flow velocities and the calculated temperature is within an allowable range, i.e., whether a converged solution is obtained for the boundary value. If a converged solution is obtained for the boundary value, the simulator ends the simulation. If a converged solution is not obtained for the boundary value, the simulator repeats the above simulation until a converged solution is obtained for the boundary value. After the simulation ends, the administrator, etc., assesses the current situation using the simulation result.

However, in the conventional technique described above, it takes a significantly long time for the simulation that is conducted to analyze the air-conditioning state in the data center; therefore, analysis of the situation is not made quickly. When a problem occurs in the data center, the situation can be analyzed and assessed only after the series of processes described above is performed. Then, it takes a significantly long time to analyze the situation and to take countermeasures for the problem.

For example, assume that it is necessary for the conventional simulator to repeat the finite iterative calculation about 200 times until the error of the conservation equation decreases to an allowable level, as illustrated in FIG. 15. In this case, when a temperature problem occurs in the data center, the conventional simulator initializes previously calculated results after collecting the analysis conditions and generating the analysis model as describe earlier. Thereafter, the conventional simulator performs a calculation about 200 times to create the information for analyzing the situation. Therefore, it takes a long time for the administrator, etc., to analyze the situation and, even longer time to take countermeasures for the problem.

SUMMARY

According to an aspect of an embodiment of the invention, a thermal-fluid-simulation analyzing apparatus includes: an execution unit that generates an analysis model using analysis conditions and that conducts a first thermal fluid simulation analysis based on the generated analysis model, the analysis condition being a condition in a thermal fluid simulation analysis according to which an air conditioning state in a predetermined space is simulated; an analysis-condition collecting unit that, when a predetermined period passes after the first thermal fluid simulation analysis by the execution unit, collects analysis conditions; a condition extracting unit that extracts a boundary condition from the analysis conditions that are collected by the analysis-condition collecting unit when the predetermined period passes after the first thermal fluid simulation analysis, the boundary condition being an analysis condition that has changed relative to a corresponding analysis condition used for the first thermal fluid simulation analysis; and a re-execution unit that selects a region corresponding to the boundary condition extracted by the condition extracting unit from regions of the analysis model generated by the execution unit, updates the selected region with the boundary condition, and conducts a second thermal fluid simulation analysis for the updated analysis model.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a block diagram of the configuration of a thermal-fluid-simulation analyzing apparatus according to a first embodiment;

FIG. 2 is an example of a table of items that are stored in an analysis condition DB;

FIG. 10 is an example of an association table that contains types of alarms and items to be re-defined;

DESCRIPTION OF EMBODIMENT(S)

Figure 3:
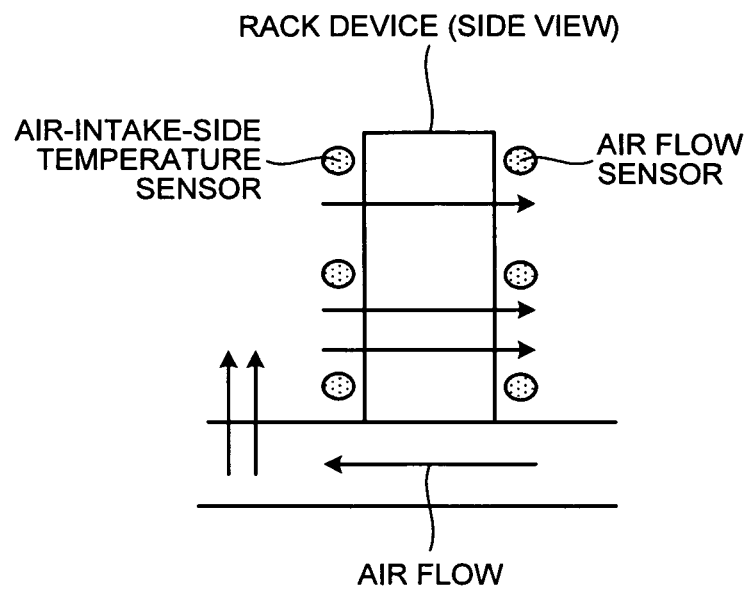
FIG. 3 is a side view of an example of a rack device, the rack device having temperature sensors and air flow sensors attached.

Preferred embodiments of the present invention will be explained with reference to accompanying drawings. It is noted that the present invention is not limited to the preferred embodiments.

[a] First Embodiment

Embodiments of a thermal-fluid-simulation analyzing apparatus according to the present invention are described in detail below with reference to the accompanying drawings. The configuration of a thermal-fluid-simulation analyzing apparatus according to a first embodiment, processes performed by the thermal-fluid-simulation analyzing apparatus, and effects of the first embodiment are described in the following sections.

The thermal-fluid-simulation analyzing apparatus disclosed in the present application conducts a thermal fluid simulation analysis by simulating an air-conditioning state of a predetermined space, for example, an air-conditioning state of a data center. The thermal-fluid-simulation analyzing apparatus can be used for any spaces other than the interior of data centers where temperature adjustment and air-flow adjustment are needed, such as movie houses and agricultural facilities.

A data center includes a rack device that accommodates an information technology (IT) device, an air conditioner that takes in exhaust air from the IT devices and supplies cooling air to a underfloor space, for example, and a grille that circulates the cooling air from the underfloor space to a space above the floor level. The IT device takes in the cooling air supplied from the air conditioner, cools down their internal electronics, etc., and discharges the heated air to a room space. Therefore, the temperature in the data center is kept at a relatively low level for cooling the IT-device.

The configuration of the thermal-fluid-simulation analyzing apparatus according to the first embodiment is described below with reference to FIG. 1. FIG. 1 is a block diagram of the configuration of the thermal-fluid-simulation analyzing apparatus according to the first embodiment.

As illustrated in FIG. 1, a thermal-fluid-simulation analyzing apparatus 10 is a computer device that includes a communication control I/F unit 11, an input unit 12, a display unit 13, a storage unit 15, and a control unit 20.

The communication control I/F unit 11 has a plurality of ports and controls information sent to or received from an external device. For example, the communication control I/F unit 11 is connected to a computer such as an administrator device that receives a simulation result (analysis result) given by the thermal-fluid-simulation analyzing apparatus 10 and that considers countermeasures in accordance with the simulation result. The communication control I/F unit 11 sends the simulation result to the administrator device.

The input unit 12 receives pieces of information and is, for example, a keyboard, a mouse, or a microphone. The input unit 12 receives, for example, a simulation start instruction and a simulation end instruction and sends the received instructions to the control unit 20 described later. The display unit 13 described later implements a pointing device function in cooperation with the mouse.

The display unit 13 outputs various pieces of information and is, for example, a monitor, a display, a touch panel, or a speaker. The display unit 13 displays/outputs, for example, simulation result obtained by the thermal-fluid-simulation analyzing apparatus 10, etc.

The storage unit 15 is, for example, a semiconductor memory, such as a random access memory (RAM), a read only memory (ROM), and a flash memory, or a storage device, such as a hard disk and an optical disk. The storage unit 15 stores therein data and programs for processes performed by the control unit 20. The storage unit 15 includes an analysis condition DB 15a and an analysis result DB 15b.

The analysis condition DB 15a is a storage device as illustrated above, and stores therein analysis conditions. The stored analysis conditions are used when an execution unit 20a described later generates an analysis model. As illustrated in FIG. 2, the analysis condition DB 15a stores therein, as items of the analysis conditions, floor information (outer shape and height), arrangement information (racks, grilles, and air conditioners), amounts of rack-generated heat, volumes of rack exhaust-air, grille information (the grille aperture ratios), cooling performances of the air conditioners, flow volumes of the air conditioners, etc. FIG. 2 is an example of a table of the items that are stored in the analysis condition DB.

Some of the items are prestored by a data-center administrator or a person in charge of IT-device maintenance, the items including the floor information (outer shape and height), the arrangement information (racks, grilles, and air conditioners), the grille information (the grille aperture ratios), the cooling performances of the air conditioners, the flow volumes of the air conditioners, etc. Moreover, although both the amounts of rack-generated heat and the volumes of rack exhaust-air can be prestored, it is possible to set temperature sensors and air flow sensors attached to the rack devices, etc., and obtain their actual measured values when a simulation starts.

As illustrated in FIG. 3, temperature sensors may be attached to the air intake side, and air flow sensors may be attached to the air outlet side of the rack device. The air intake side is a side from which the cooling air is supplied to the IT devices in the rack device. The air outlet side is a side from which the exhaust air is discharged. With this configuration, data is obtained that includes the temperature of the cooling air supplied to the IT devices and the volume of the exhaust air discharged from the IT devices. FIG. 3 is a side view of an example of the rack device including the temperature sensors and the air flow sensors.

The analysis result DB 15b is a storage device as illustrated above, and stores therein the simulation result given by the control unit 20. For example, the analysis result DB 15b stores therein the simulation results in association with the date and time when the simulation is conducted and the analysis conditions of the simulation.

The control unit 20 is, for example, an integrated circuit such as an application specific integrated circuit (ASIC) and a field programmable gate array (FPGA), or an electric circuit such as a central processing unit (CPU) or a micro processing unit (MPU). The control unit 20 includes an internal memory that stores therein control programs, such as operating system (OS), computer programs that define processing procedures, and data. Furthermore, the control unit 20 includes the execution unit 20a, an analysis-condition collecting unit 20b, a condition extracting unit 20c, and a re-execution unit 20d and performs various processes using these units.

The execution unit 20a generates an analysis model using the analysis conditions and conducts a thermal fluid simulation analysis for the generated analysis mode. The analysis conditions are conditions in simulating an air-conditioning state of a predetermined space during the thermal fluid simulation analysis.

Figure 4:
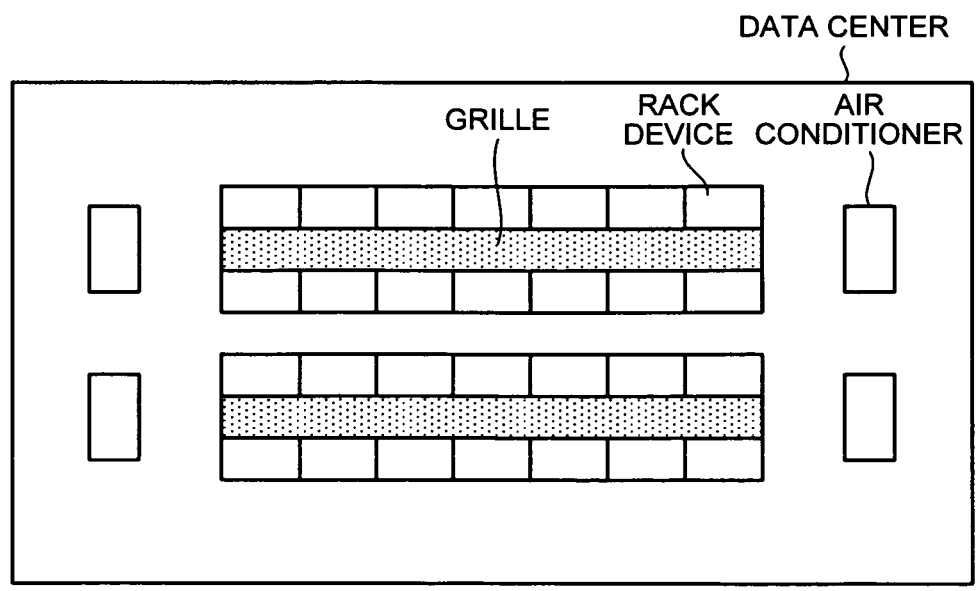
FIG. 4 is an exemplary plan view of an interior of a data center.

More specifically, the execution unit 20a obtains, from the analysis condition DB 15a, the analysis conditions for the data center where the air conditioners, the grilles, and the rack devices are arranged as illustrated in FIG. 4. For example, the execution unit 20a collects the analysis conditions that include the floor information, the information about arrangement of the rack devices, the grilles, and the air conditioners, the amounts of rack-generated heat, the volumes of rack exhaust-air, the grille aperture ratios, the cooling performances of the air conditioners, the flow volumes of the air conditioners, etc. FIG. 4 is an exemplary plan view of an interior of the data center.

Figure 5:
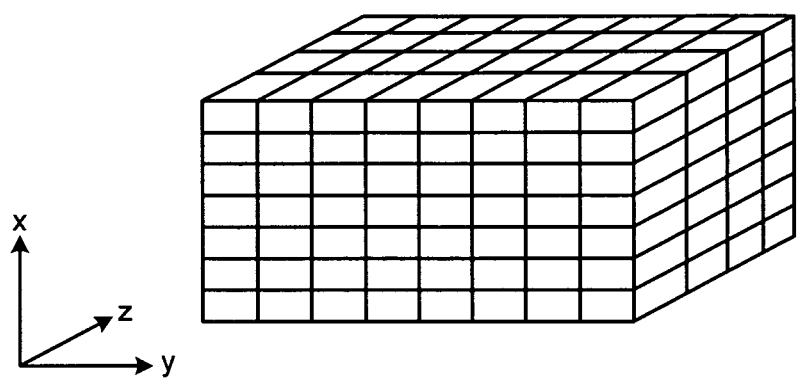
FIG. 5 is a schematic diagram of a data center that is divided into meshes using a finite volume method.

After that, the execution unit 20a defines (sets), using the collected analysis conditions, the shape of the data center, the heat generating conditions of the rack devices, the intake/outlet air volumes of the individual IT devices, the total intake/outlet air volume of the rack devices, the total air flow volume of the data center, etc., thereby generating an analysis model. The execution unit 20a then divides the analysis model into meshes as illustrated in FIG. 5 by transforming conservation equations (e.g., the Navier-Stokes equation) of the air flow and the thermal transfer in the data center into finite volumes. The mesh division is performed using a typical finite volume method and its detailed description is omitted. FIG. 5 is a schematic diagram of the data center that is divided into meshes using the finite volume method.

After that, the execution unit 20a performs coupling so that one parameter of the conservation equation, e.g., the Navier-Stokes equation, depends on another parameter or a value nearby and then performs a finite iterative calculation repeatedly until the error of the conservation equation decreases to an allowable level, thereby causing the solutions to converge and thus solving the conservation equation. More particularly, the execution unit 20a causes the solutions of the Navier-Stokes equation to converge using a widely-known splitting method, for example, a SIMPLE algorism.

For example, after setting the default values in the conservation equation, the execution unit 20a calculates, using the conservation equation, both the flow velocity in the x axis of the mesh-divided space and the flow velocity in the y axis. The execution unit 20a then calculates the pressure in the mesh-divided space, updates the flow velocity and the density for the conservation equation, and calculates the temperature using another equation, e.g., the heat equation. The execution unit 20a determines whether an error between a threshold and a boundary value that is determined according to the calculated flow velocities and the calculated temperature is within an allowable range, i.e., whether a converged solution is obtained for the boundary value. If a converged solution is obtained for the boundary value, the execution unit 20a completes the simulation. If a converged solution is not obtained for the boundary value, the execution unit 20a repeats the above simulation until a converged solution is obtained for the boundary value. After the simulation is completed, the administrator, etc., analyzes the situation using the simulation result.

Still more particularly, the execution unit 20a uses Navier-Stokes equations that includes a mass conservation equation represented by Equation (1), momentum conservation equations represented by Equations (2) and (3), and an energy conservation equation represented by Equation (4). The manner of solving the Navier-Stokes equations using the SIMPLE algorism is widely known; therefore, the manner is described briefly. It is noted that the analysis method and the equations described herein are merely examples and any other methods or equations can be used.

$$\int_{\Omega_{cv}} \frac{\partial \rho}{\partial t} d\Omega = -\int_{A_{cv}} \rho \vec{V} \cdot \vec{n} dA \tag{1}$$

$$\int_{\Omega_{cv}} \frac{\partial \rho u_i}{\partial t} d\Omega = -\int_{A_{cv}} \rho u_i \vec{V} \cdot \vec{n} dA + \int_{A_{cv}} \mu(gradu_i) \cdot \vec{n} dA + S^{u_i} \tag{2}$$

$$S^{u_i} = -\int_{A_{cv}} p\vec{i}_i \cdot \vec{n} dA - \int_{A_{cv}} \frac{2}{3}\mu(div\vec{V})\vec{i}_i \cdot \vec{n} dA + \int_{A_{cv}} \mu grad\vec{V} \cdot \vec{i}_i \cdot \vec{n} dA + \int_{\Omega_{cv}} \rho \vec{g} d\Omega \tag{3}$$

$$\int_{\Omega_{cv}} \frac{\partial \rho E}{\partial t} d\Omega = -\int_{A_{cv}} \rho E \vec{V} \cdot \vec{n} dA + \int_{A_{cv}} k(gradT) \cdot \vec{n} dA - \int_{A_{cv}} p\vec{V} \cdot \vec{n} dA \tag{4}$$

The parameters of the above equations are described below. Firstly, "$\Omega$" is a closed region in the space of the data center or the volume of the closed region; "A" is the boundary surface of the region $\Omega$ adjacent to the outside or the area of the boundary surface. "n" is the unit vector; and "$u_i$" (i=1, 2, or 3) is the flow velocity component of the Cartesian coordinate system. "$\rho$" is the mass of fluid per unit area in the data center; "$\mu$" is the viscosity coefficient that is the ratio between the shearing stress and the velocity gradient; and "p" is the value of pressure on the data center. "E" is the amount of energy in the data center; "T" is the temperature. "k" is the thermal conductivity indicative of the ratio between the thermal flux and the thermal gradient (Fourier's law). "S" is the source term (pressure term) indicative of the pressure in the data center, i.e., in the meshes.

The simplified flow of the processes is described below. The execution unit 20a calculates, using the momentum conservation equations represented by Equations (2) and (3), a "flow velocity V" in each of the x axis, the y axis, and the z axis of the mesh-divided data center. More particularly, the execution unit 20a substitutes the known pressure p in Equations (2) and (3), thereby calculating a predictive value of the flow velocity V.

After that, the execution unit 20a creates, using the mass conservation equation represented by Equation (1) and the momentum conservation equation represented by Equation (2), an equation that is to be satisfied by both a correction amount for the pressure and a correction amount for the flow velocity. The execution unit 20a then expresses the correction amount for the flow velocity depending on the correction amount for the pressure, calculates the pressure equation with only the correction amount for the pressure being an unknown, updates the pressure and the flow velocity, and calculates the pressure (pressure field) and the flow velocity (flow velocity field) that satisfy both the momentum conservation equation and the mass conservation equation. In other words, the execution unit 20a calculates both the correction value for the pressure and the correction value for the flow velocity and updates the flow velocity V that is predicted using the known pressure p.

Thereafter, the execution unit 20a calculates the energy E using the mass conservation equations represented by Equations (5) and (6), the Newton's second law of motion, the thermodynamic law, etc. The execution unit 20a calculates the temperature T using the calculated energy E and Equation (4):

Mass $m$=density $\rho$×volume V (5)

Mass $m$=$\rho$×flow velocity $u$×area A×time (6)

After that, the execution unit 20a determines whether an error between the threshold and the boundary value that is determined according to the calculated flow velocities and the calculated temperature is within an allowable range, i.e., whether a converged solution is obtained for the boundary value. If a converged solution is obtained for the boundary value, the execution unit 20a ends the simulation. If a converged solution is not obtained for the boundary value, the execution unit 20a repeats the above simulation until a converged solution is obtained for the boundary value. With this configuration, the execution unit 20a can calculate a simulation result indicating, for example, how the temperature in the data center changes after the simulation has been conducted. The execution unit 20a displays/outputs the calculated simulation result on/to the display unit 13 and stores the calculated simulation result in the analysis result DB 15b.

Referring back to FIG. 1, at a predetermined period after the thermal fluid simulation analysis has been conducted by the execution unit 20a, the analysis-condition collecting unit 20b collects the analysis conditions at that point of time. For example, one hour after the thermal fluid simulation analysis is conducted, the analysis-condition collecting unit 20b collects the analysis conditions at that point of time that include the floor information, the arrangement information, the amounts of rack-generated heat, the volumes of rack exhaust-air, the grille aperture ratios, the cooling performances of the air conditioners, the flow volumes of the air conditioners, etc. More particularly, in the same manner as the execution unit 20a collects, the analysis-condition collecting unit 20b collects, for example, information that is prestored by the data-center administrator or the person in charge of IT-device maintenance and the actual values measured by the temperature sensors and the air flow sensors. The period can be set appropriately by the administrator, etc. The analysis-condition collecting unit 20b then outputs the collected analysis conditions to the condition extracting unit 20c.

The condition extracting unit 20c extracts boundary conditions from the analysis conditions that are collected by the analysis-condition collecting unit 20b after the predetermined period after the thermal fluid simulation analysis has been conducted. The boundary conditions are conditions that have changed relative to the corresponding conditions used for the simulation conducted by the execution unit 20a. For example, the condition extracting unit 20c compares the analysis conditions collected by the analysis-condition collecting unit 20b with the analysis conditions used for the thermal fluid simulation analysis by the execution unit 20a, and extracts different conditions as the boundary conditions. The condition extracting unit 20c then outputs the extracted boundary conditions to the re-execution unit 20d. If, for example, the condition extracting unit 20c determines through the comparison that the "amount of rack-generated heat" and the "volume of rack exhaust air" are updated, the condition extracting unit 20c outputs the actual values of the "amount of rack-generated heat" and the "volume of rack exhaust air" measured using the sensors, etc., to the re-execution unit 20d.

The re-execution unit 20d selects a region corresponding to the boundary conditions that are extracted by the condition extracting unit 20c from regions of the analysis model that is generated by the execution unit 20a, updates the selected region with the boundary conditions, and conducts the thermal fluid simulation analysis for the updated analysis model. More particularly, when the boundary conditions are extracted by the condition extracting unit 20c, the re-execution unit 20d selects a region that is defined by the boundary conditions from the regions of the analysis model that is generated by the execution unit 20a. The re-execution unit 20d then re-defines the selected region on the analysis model that is generated by the execution unit 20a, i.e., updates the selected region with the boundary conditions that are extracted by the condition extracting unit 20c. After that, the re-execution unit 20d conducts the thermal fluid simulation analysis for the analysis model updated with the boundary conditions.

Figure 6:
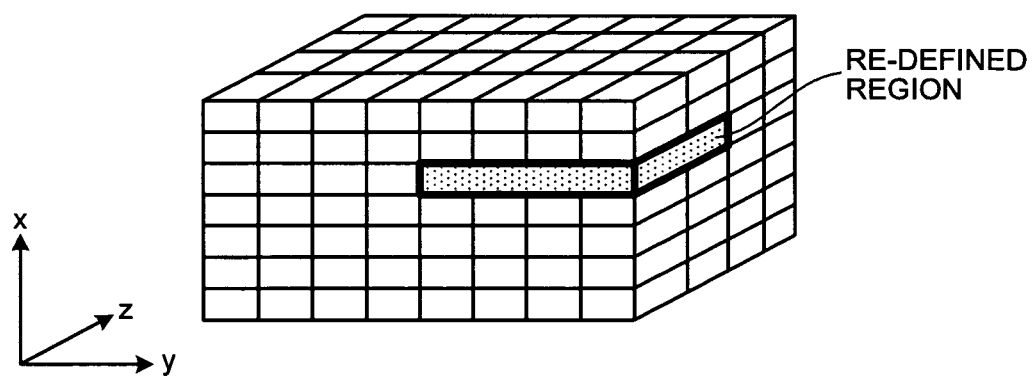
FIG. 6 is a schematic diagram that illustrates a re-defined region that is a target of simulation.

With this configuration, during the process performed, for example in the above example, one hour after the last simulation is conducted, the re-execution unit 20d need not to generate a new analysis model by collecting the analysis conditions and to perform mesh division. As illustrated in FIG. 6, the re-execution unit 20d updates the existing analysis model (in the above example, the analysis model generated one hour ago) and its meshes with only some analysis conditions different from the previous analysis conditions and conducts the thermal fluid simulation analysis for the updated analysis model and the updated meshes. FIG. 6 is a schematic diagram that illustrates the re-defined region that is to be simulated.

With this configuration, the re-execution unit 20d can calculate a simulation result indicating, for example, how the temperature in the data center changes after the simulation has been conducted. The re-execution unit 20d displays/outputs the calculated simulation result on/to the display unit 13 and stores the calculated simulation result in the analysis result DB 15b.

In the above example, the re-execution unit 20d re-defines the analysis model by updating only the "amount of rack-generated heat" and the "volume of rack exhaust air" that are determined as the analysis conditions different from the corresponding analysis conditions one hour ago and conducts the thermal fluid simulation analysis for the updated analysis model. In other words, the re-execution unit 20d changes the value of the "amount of rack-generated heat" and the value of the "volume of rack exhaust air" of the analysis conditions one hour ago to the value of the "amount of rack-generated heat" and the value of the "volume of rack exhaust air" that are newly collected one hour after the simulation is conducted, respectively. With these updates, the existing analysis model generated one hour ago and the values of the "amount of rack-generated heat" and the "volume of rack exhaust air" of the mesh region are also updated. The re-execution unit 20d conducts the thermal fluid simulation analysis for the updated analysis model.

Flow of Processes Performed by the Thermal-Fluid-Simulation Analyzing Apparatus

Figure 7:
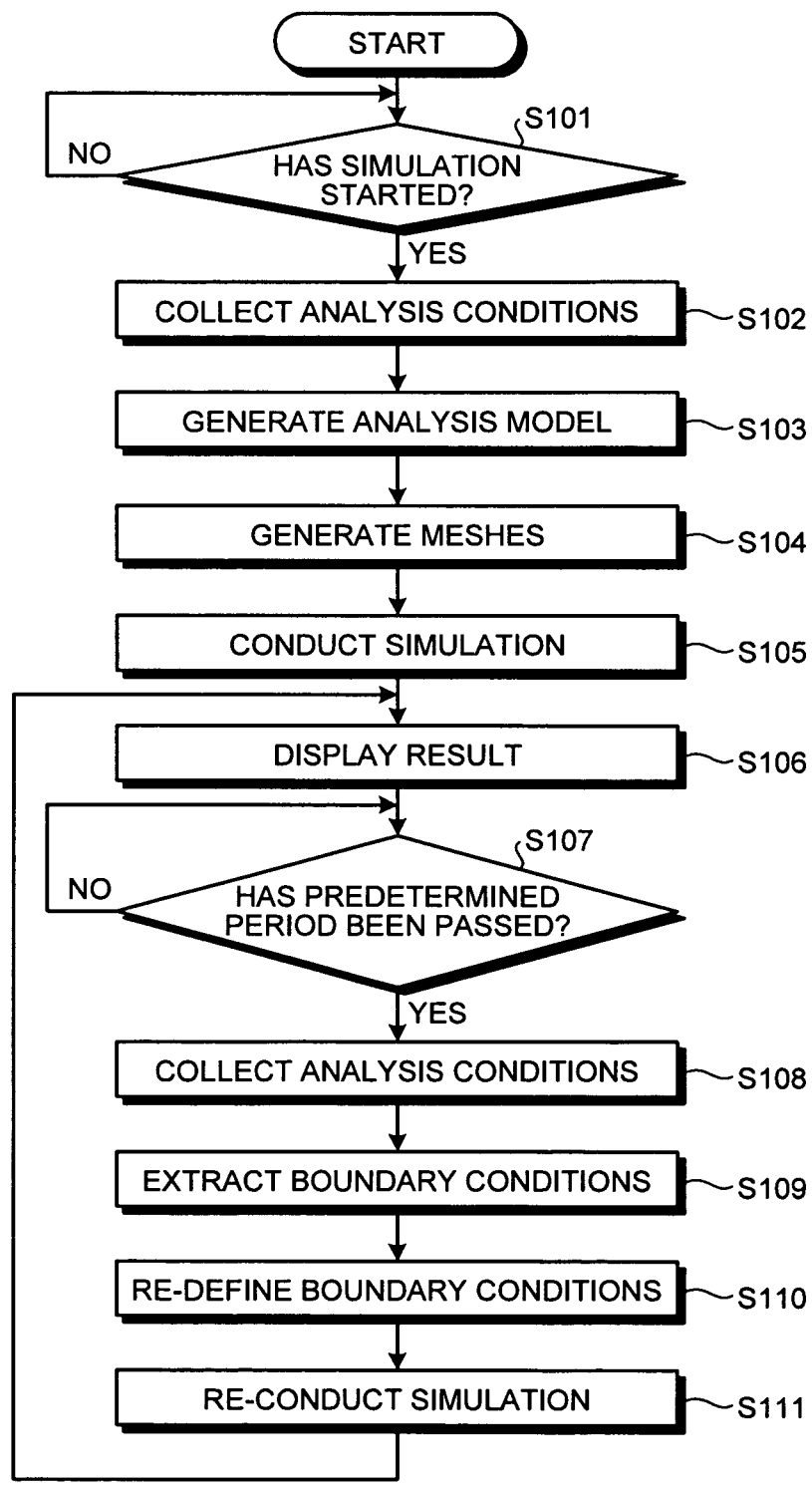
FIG. 7 is a flowchart of processes performed by the thermal-fluid-simulation analyzing apparatus according to the first embodiment.

The processes performed by the thermal-fluid-simulation analyzing apparatus according to the first embodiment are described below with reference to FIG. 7. FIG. 7 is a flowchart of the processes performed by the thermal-fluid-simulation analyzing apparatus according to the first embodiment.

As illustrated in FIG. 7, when a simulation start instruction is received by the input unit 12, etc., (Yes at Step S101), the execution unit 20a collects the analysis conditions (Step S102).

Moreover, the execution unit 20a generates an analysis model by defining the collected analysis conditions (Step S103). Furthermore, the execution unit 20a divides the generated analysis model into meshes by transforming the conservation equations (e.g., the Navier-Stokes equation) of the air flow and the thermal transfer in the generated analysis model into finite volumes (Step S104).

After that, the execution unit 20a conducts the thermal flow simulation that involves performing coupling with the conservation equation, e.g., the Navier-Stokes equation, and then performing a finite iterative calculation repeatedly until the error of the conservation equation decreases to an allowable level, thereby causing the solutions to converge and thus solving the conservation equation (Step S105). The execution unit 20a then displays/outputs the simulation result on/to the display unit 13 and stores the simulation result in the analysis result DB 15b (Step S106).

When a predetermine period has passed after the thermal fluid simulation analysis has been conducted by the execution unit 20a (Yes at Step S107), the analysis-condition collecting unit 20b collects the analysis conditions at this point of time (Step S108).

After that, the condition extracting unit 20c extracts the boundary conditions from the analysis conditions that are collected by the analysis-condition collecting unit 20b after the predetermined period after the thermal fluid simulation analysis has been conducted (Step S109). The re-execution unit 20d selects a region corresponding to the boundary conditions that are extracted by the condition extracting unit 20c from the regions of the analysis model that is generated by the execution unit 20a and updates the selected region with the boundary conditions (Step S110). The re-execution unit 20d conducts the thermal fluid simulation analysis for the analysis model updated only with the boundary conditions (Step S111). The processes at Step S106 and the subsequent steps are repeated until a device end instruction or a simulation end instruction is received by the input unit 12, etc.

Effects of the First Embodiment

As described above, in the first embodiment, because the previous conditions are available at the start of a new thermal fluid simulation, it is possible to conduct the new thermal fluid simulation for the updated analysis model that is generated by re-defining only some conditions that have changed relative to the corresponding previous conditions. Therefore, for example, it takes shorter time to simulate the air-conditioning state in the data center using the thermal fluid simulation, which enables a quick analysis of the current situation.

Figure 8:
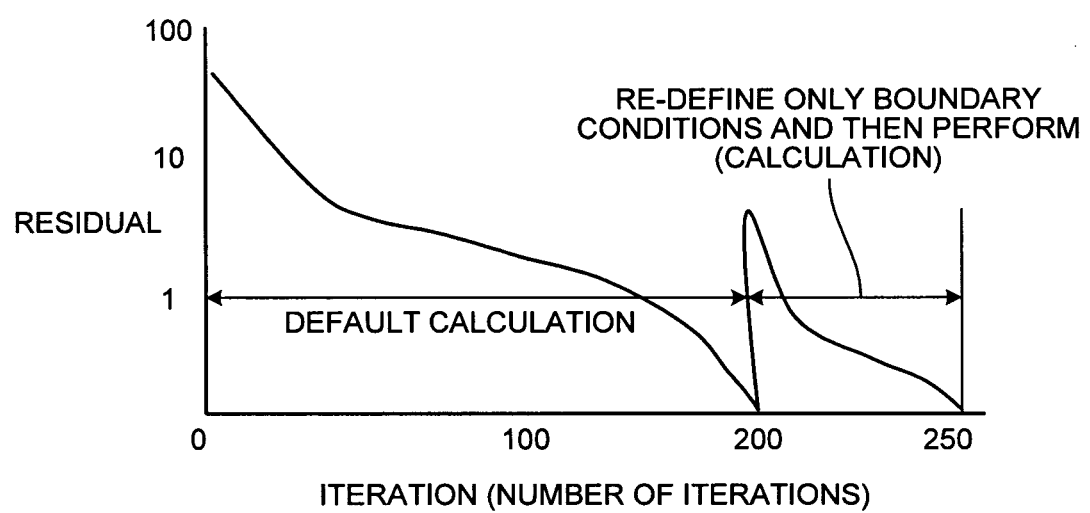
FIG. 8 is a graph of an example of a convergence curve when the simulation is re-conducted by re-defining only boundary condition.

When, for example, the thermal-fluid-simulation analyzing apparatus disclosed in the present application is used, the number of iterations of the default calculation, in other words, the number of the thermal fluid simulations using the default values is about 200, as illustrated in FIG. 8. The number of iterations of the subsequent calculation decreases to about 50, because the analysis is conducted for the updated analysis model that is generated by re-defining only some conditions that have changed relative to the corresponding previous conditions. The conventional simulator repeats the same number (about 200 in this example) of iterations for the subsequent calculation as it is repeated for the default calculation; therefore, it takes a significantly long time for one simulation. In contrast, the thermal-fluid-simulation analyzing apparatus disclosed in the present application analyzes the updated analysis model that is generated by re-defining only some conditions that have changed relative to the corresponding previous conditions during the calculation subsequent to the default calculation, i.e., conducts the thermal fluid simulation for the updated conditions, which significantly reduces the number of iterations of the calculation. As a result, it takes shorter time to simulate the air-conditioning state in the data center using the thermal fluid simulation, which enables a quick analysis of the situation. FIG. 8 is a graph of an example of a convergence curve when the simulation is re-conducted by re-defining only the boundary conditions.

[b] Second Embodiment

Although, in the first embodiment, the example is described where the simulation is re-conducted after a predetermined period after the default simulation has been conducted, the configuration is not limited thereto. It can be configured to re-conduct the simulation when an alarm is generated because, for example, the temperature in the data center increases to a threshold or higher or because the temperature sensors or the air flow sensors that are attached to the rack devices detect an abnormal temperature or an abnormal air flow.

Figure 9:
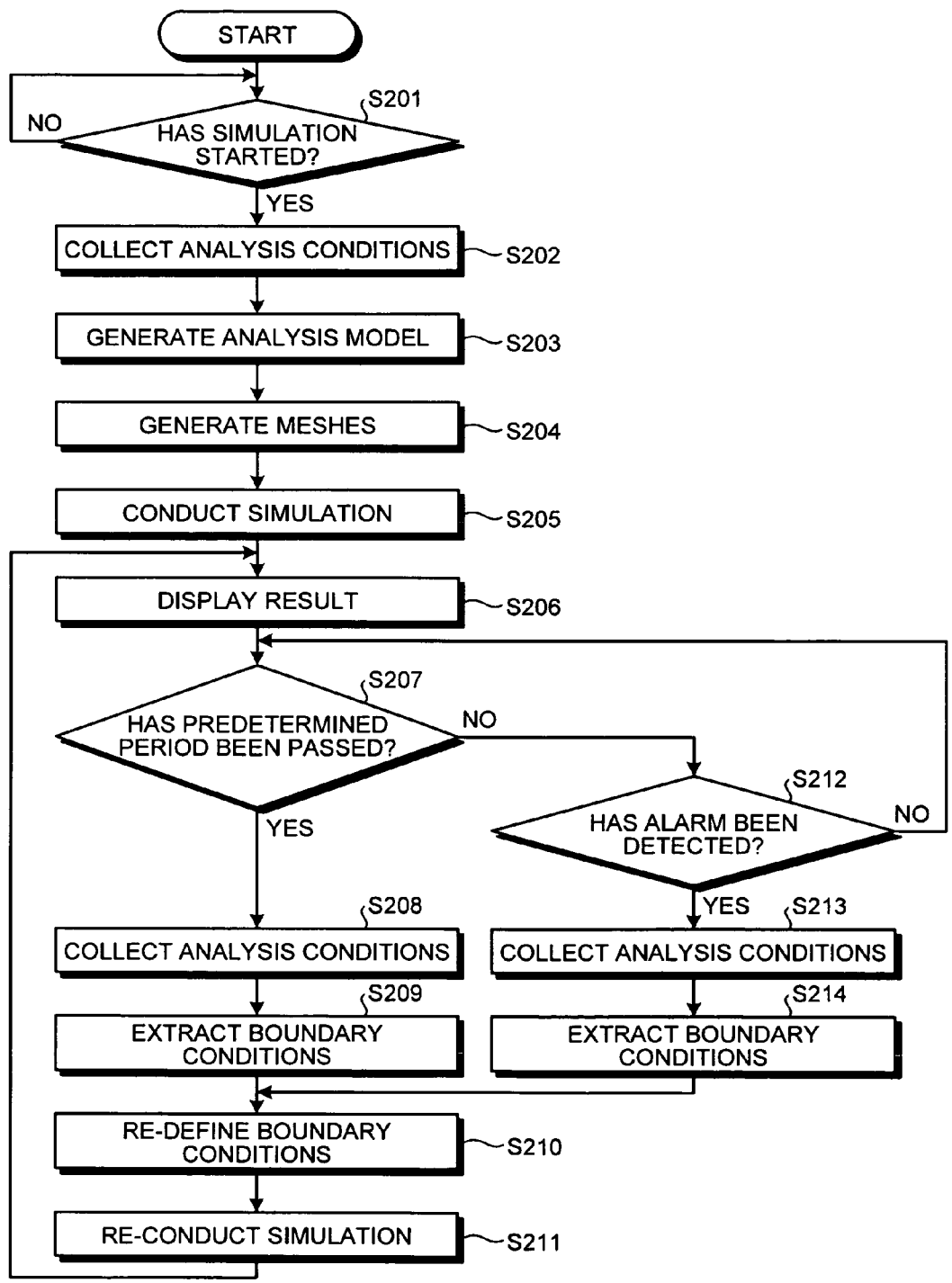
FIG. 9 is a flowchart of processes performed by a thermal-fluid-simulation analyzing apparatus according to a second embodiment.

The flow of processes of re-conducting the simulation when an alarm is generated in the data center is described according to the second embodiment with reference to FIGS. 9 and 10. FIG. 9 is a flowchart of the processes performed by a thermal-fluid-simulation analyzing apparatus according to the second embodiment; FIG. 10 is an example of an association table that contains the types of alarms and the items to be re-defined.

The processes of Steps S201 to S211 illustrated in FIG. 9 are the same as the processes of Steps S101 to S111 described in the first embodiment; therefore, the same description is not repeated. Only the processes in Steps S212 to S214 will be described because they are different from the processes in the first embodiment.

More particularly, after the thermal fluid simulation analysis is conducted but before a predetermined period has passed (No at Step S207), the thermal-fluid-simulation analyzing apparatus 10 determines whether an alarm is detected by the sensors (Step S212).

For example, the thermal-fluid-simulation analyzing apparatus 10 obtains the actual values measured by the temperature sensors and the air flow sensors in the data center or the temperature sensors and the air flow sensors attached to each of the rack devices and determines whether the actual measured values are higher than the predetermined thresholds. Although, in this example, the thermal-fluid-simulation analyzing apparatus 10 obtains the actual measured values using the sensors and determines whether a problem occurs, the configuration is not limited thereto. It can be configured to, for example, output an alarm to the thermal-fluid-simulation analyzing apparatus 10 when the temperature sensors detect a temperature higher than the threshold or when the air flow sensors detect an air volume higher than the threshold.

Referring back to FIG. 9, when an alarm is detected (Yes at Step S212), the analysis-condition collecting unit 20b of the thermal-fluid-simulation analyzing apparatus 10 collects the analysis conditions in accordance with the type of the alarm (Step S213). The condition extracting unit 20c extracts the analysis conditions collected by the analysis-condition collecting unit 20b as the boundary conditions (Step S214). When no alarm is detected (No at Step S212), the process control returns to Step S207 and the subsequent processes are performed.

The analysis-condition collecting unit 20b stores in the storage unit 15, for example, the database as illustrated in FIG. 10 that contains the types of alarms and the items to be re-defined in an associated manner. When an alarm is detected, the analysis-condition collecting unit 20b determines, by referring to FIG. 10, the items to be re-defined by the type of the detected alarm. If, for example, a temperature alarm is detected by a temperature sensor attached to the air intake side of a rack device, the analysis-condition collecting unit 20b determines the "volume of rack exhaust air", the "cooling performance of the air conditioner", and the "flow volume of the air conditioner" to be the items to be re-defined and obtains the actual measured values of each of the items to be re-defined from the sensors, the administrator, etc. If an air-volume alarm is detected by an air flow sensor attached to a grille, the analysis-condition collecting unit 20b determines the "arrangement information" and the "flow volume of the air conditioner" to be the items to be re-defined and obtains the actual measured values of each of the items to be re-defined.

After the analysis-condition collecting unit 20b determines, by referring to the database illustrated in FIG. 10, the items to be re-defined, the condition extracting unit 20c extracts the items to be re-defined as the boundary conditions. In the above example, if a temperature alarm is detected by a temperature sensor attached to the air intake side of a rack device, the condition extracting unit 20c extracts the actual measured values of the "volume of rack exhaust air", the "cooling performance of the air conditioner", the "flow volume of the air conditioner" as the boundary conditions. If an air-volume alarm is detected by an air flow sensor attached to a grille, the condition extracting unit 20c extracts the actual measured values of the "arrangement information" and the "flow volume of the air conditioner" as the boundary conditions.

Referring back to FIG. 9, in the same manner as in the first embodiment, the re-execution unit 20d selects a region corresponding to the boundary conditions that are extracted by the condition extracting unit 20c from regions of the analysis model that is generated by the execution unit 20a and updates the selected region with the boundary conditions (Step S210). The re-execution unit 20d conducts the thermal fluid simulation analysis for the analysis model updated only with the boundary conditions (Step S211). After that, the thermal-fluid-simulation analyzing apparatus 10 repeats the processes at Step S206 and the subsequent steps until a device end instruction or a simulation end instruction is received by the input unit 12, etc.

As described above, in the second embodiment, when a problem occurs and an alarm is generated, the thermal-fluid-simulation analyzing apparatus 10 obtains the actual measured values (of a mesh region) of the analysis conditions subjected to the problem indicated by the alarm. The thermal-fluid-simulation analyzing apparatus 10 then updates (re-defines) the analysis model with the actual measured values of the analysis conditions that are obtained in accordance with the alarm and conducts the thermal fluid simulation analysis for the updated (re-defined) analysis model. Therefore, the thermal fluid simulation is conducted in a short time after the occurrence of the problem, which enables quick analysis of the abnormal situation and quick selection of a countermeasure.

[c] Third Embodiment

As described above, the thermal-fluid-simulation analyzing apparatus 10 disclosed in the present application can display the simulation result on the display unit 13. Furthermore, the thermal-fluid-simulation analyzing apparatus 10 can be configured to compare a simulation result with its immediately previous simulation result and display a result of the comparison on the display unit 13.

Figure 11:
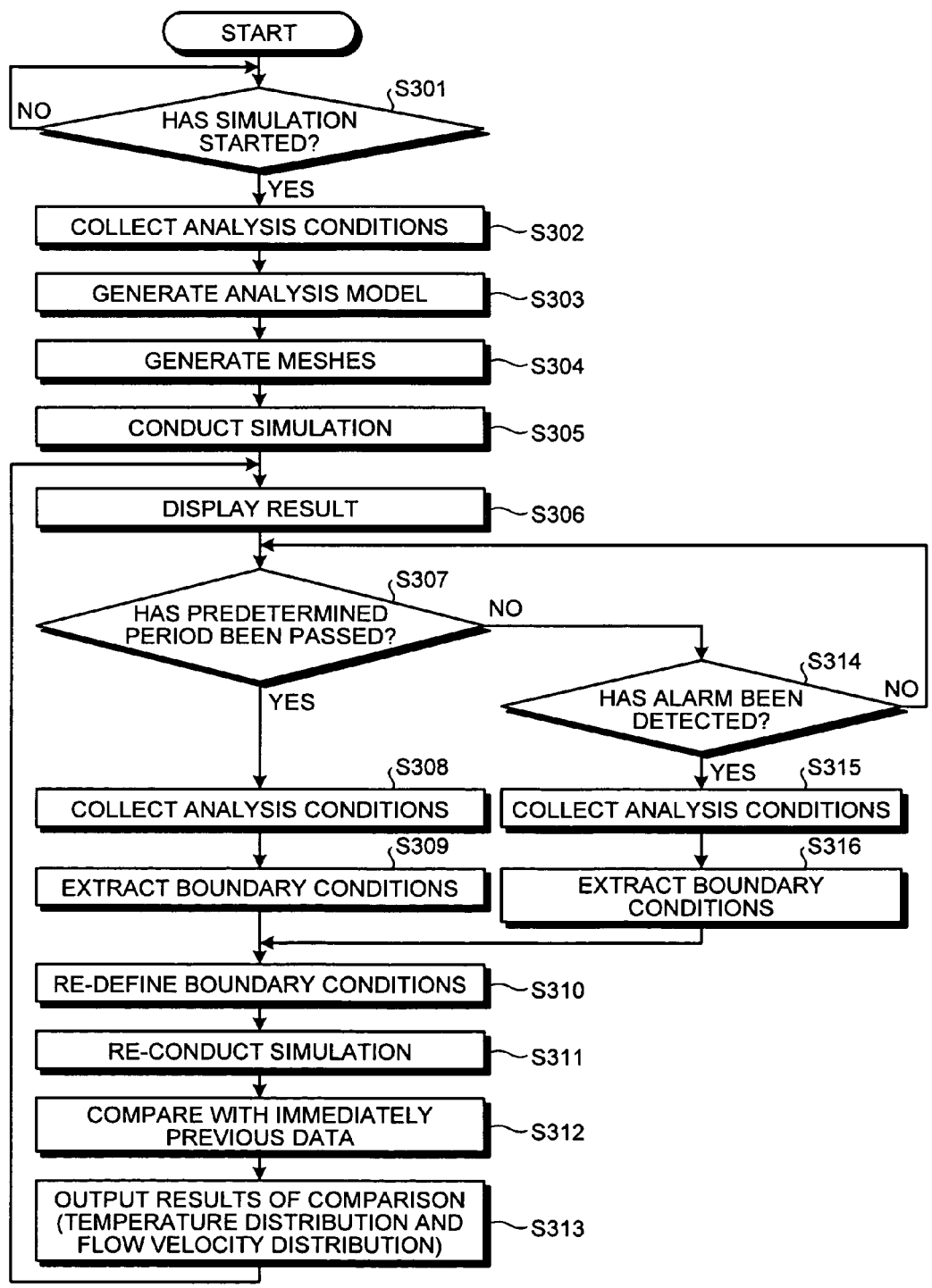
FIG. 11 is a flowchart of processes performed by a thermal-fluid-simulation analyzing apparatus according to a third embodiment.

The flow of processes is described according to the second embodiment with reference to FIG. 11 for comparing a simulation result with its immediately previous simulation result. FIG. 11 is a flowchart of the processes performed by a thermal-fluid-simulation analyzing apparatus according to a third embodiment.

The processes of Steps S301 to S311 illustrated in FIG. 11 are the same as the processes of Steps S101 to S111 described in the first embodiment. Moreover, the processes of Steps S314 to S316 are the same as the processes of Steps S212 to S214 described in the second embodiment. Therefore, the same processes as those in the first embodiment and the second embodiment will not be described and only the processes of Steps S312 to S313 will be described because they are different from the processes in the first embodiment and the second embodiment.

More particularly, the re-execution unit 20d of the thermal-fluid-simulation analyzing apparatus 10 compares a simulation result given by the thermal fluid simulation analysis for the analysis model updated only with the boundary conditions with a simulation result given by the previous simulation (Step S312). The re-execution unit 20d displays/outputs a result of the comparison on/to the display unit 13 and stores the result of the comparison in the analysis result DB 15b (Step S313). After that, the thermal-fluid-simulation analyzing apparatus 10 repeats the processes at Step S306 and the subsequent steps until a device end instruction or a simulation end instruction is received by the input unit 12, etc.

If, for example, a simulation result is obtained that represents a temperature change, a flow velocity change, or an air volume change, the re-execution unit 20d compares the simulation result with the previous simulation result and extracts, as a result of the comparison, a temperature distribution, a flow velocity distribution, or an air volume distribution, etc, of the space. The result of the comparison can include not only the distributions but also, for example, difference between the current simulation and the previous simulation, temporal change of the difference, etc.

As described above, the thermal-fluid-simulation analyzing apparatus according to the third embodiment can display a result of the comparison with the previous simulation; therefore, the administrator, etc., can grasp, for example, conditions or regions that have changed significantly and obtain information indicative of a sign of a problem at an early stage. As a result, it is possible to prevent occurrence of a problem in, for example, the data center.

[d] Fourth Embodiment

The thermal-fluid-simulation analyzing apparatus 10 disclosed in the present application can be configured to compare a simulation result with the actual measured value and use a result of the comparison as feedback so that the thermal-fluid-simulation analyzing apparatus 10 can perform stable air-conditioning control.

Figure 12:
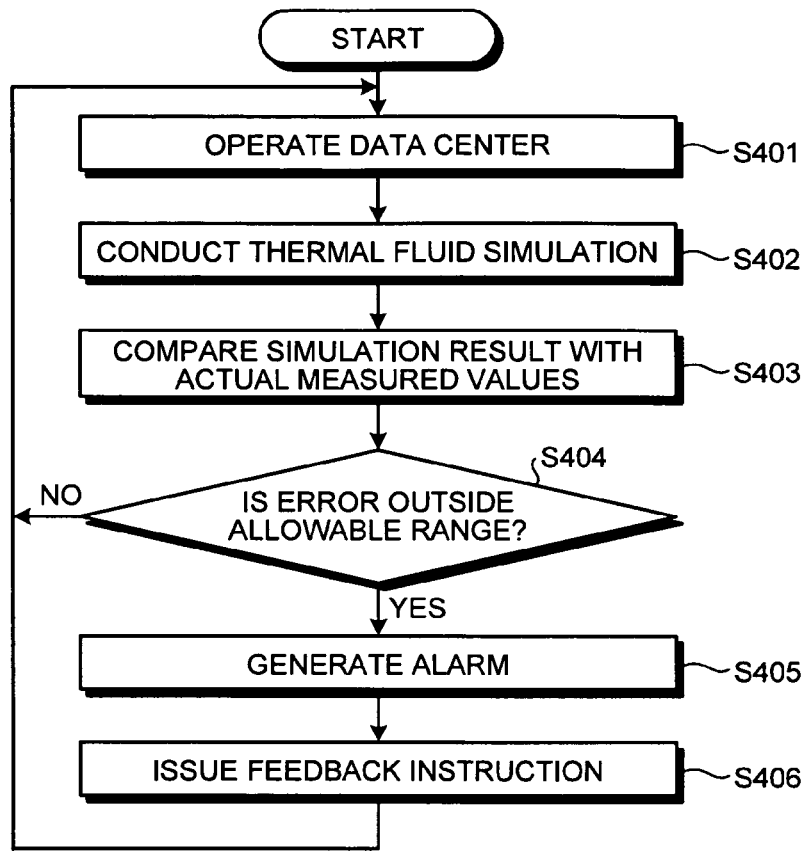
FIG. 12 is a flowchart of processes performed by a thermal-fluid-simulation analyzing apparatus according to a fourth embodiment.
Figure 13:
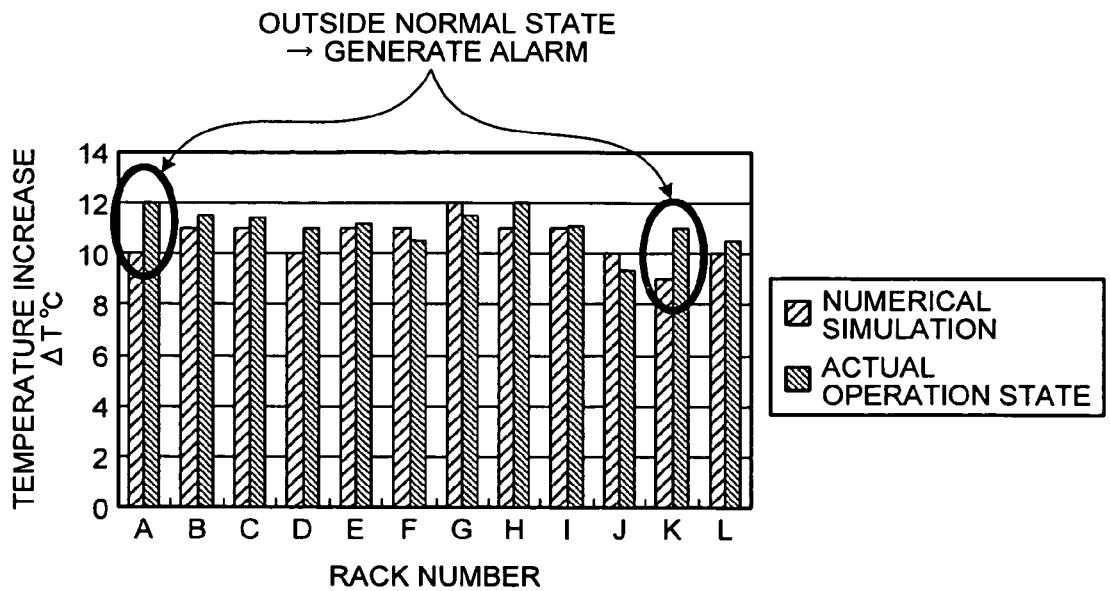
FIG. 13 is a graph that is used to compare simulation results with actual measured values.

The flow of processes for comparing a simulation result with the actual measured value and using a result of the comparison as feedback according to a fourth embodiment is described with reference to FIGS. 12 and 13. FIG. 12 is a flowchart of the processes performed by a thermal-fluid-simulation analyzing apparatus according to the fourth embodiment; FIG. 13 is a graph that is used to compare simulation results with the actual measured values.

As illustrated in FIG. 12, when the data center is placed in operation (Step S401), the thermal-fluid-simulation analyzing apparatus 10 conducts the thermal fluid simulation in the above-described manner (Step S402).

The thermal-fluid-simulation analyzing apparatus 10 obtains the actual measured value of the temperature from the sensors, etc., in the data center or attached to the rack devices every, for example, five minutes and compares the actual measured value with a predicted value of the corresponding point of time that is predicted and obtained as a simulation result (Step S403). If a result of the comparison is outside an allowable range (Yes at Step S404), the thermal-fluid-simulation analyzing apparatus 10 generates an alarm (Step S405) and sends, as feedback, a message indicating a bad condition to the administrator device, etc. (Step S406). After that, the thermal-fluid-simulation analyzing apparatus 10 repeats the processes at Step S401 and the subsequent steps until a device end instruction or a simulation end instruction is received by the input unit 12, etc. On the other hand, if the result of the comparison is within the allowable range (No at Step S404), the thermal-fluid-simulation analyzing apparatus 10 repeats the processes at Step S401 and the subsequent steps.

As illustrated in FIG. 13, the thermal-fluid-simulation analyzing apparatus 10 compares the predicted value indicative of an increase in temperature of each rack device that is obtained as a simulation result with the actual value measured using the temperature sensor attached to each rack device. In this example, because the rack number A and the rack number K are outside the allowable range, the thermal-fluid-simulation analyzing apparatus 10 determines that it is in a bad condition and generates an alarm. Furthermore, because the rack numbers A and K are outside the allowable range and it is determined to be in a bad condition, the thermal-fluid-simulation analyzing apparatus 10 sends a message to the administrator device, etc., instructing to take a countermeasure to avoid the danger.

As an effect of this configuration, a problem will be found at an early stage and it is possible to exclude an destabilizing element quickly, which contributes the stable and sustainable operation of the data center.

[e] Fifth Embodiment

Although the embodiments of the thermal-fluid-simulation analyzing apparatus 10 disclosed in the present application are described in the above, the thermal-fluid-simulation analyzing apparatus 10 can be implemented according to embodiments other than the above-described embodiments. Some of the other embodiments within the scope of the present application will be described below as a fifth embodiment.

Calculation Method

In the above-described embodiments, the simulation is conducted by calculating the conservation equations, e.g., the Navier-Stokes equation, of the air flow and the thermal transfer using a splitting method such as the SIMPLE algorism. The calculation method, however, is not limited thereto. For example, any analysis programs and algorisms can be used for the calculation as long as the thermal fluid simulation analysis is conducted.

Trigger for the Simulation

In the above-described embodiments, the trigger for simulation is the lapse of a predetermined period after the first simulation has been conducted or generation of an alarm. The trigger, however, is not limited thereto. The thermal-fluid-simulation analyzing apparatus 10 can be configured, for example, to conduct the thermal fluid simulation when the time comes at which it is predicted that the alarm is generated on the basis of the simulation result. In other words, the thermal-fluid-simulation analyzing apparatus 10 can set the time when it is predicted that an alarm is generated on the basis of the simulation result as a trigger for the simulation.

Target to be Compared

In the fourth embodiment, the simulation result is compared with the actual measured value and a result of the comparison is output to the display unit 13, etc. The target to be compared, however, is not limited thereto. The thermal-fluid-simulation analyzing apparatus 10 can be configured to, for example, compare the simulation result with indicators, etc., that include the coefficient of performance (COP), the power usage effectiveness (PUE), etc., and output a result of the comparison to the display unit 13, etc. This improves the efficiency of energy used for air conditioning in the space to be simulated.

System Configuration and Others

Furthermore, the constituent elements of the devices illustrated in the drawings are merely conceptual, and need not be physically configured as illustrated. The constituent elements, as a whole or in part, can be separated or integrated either functionally or physically based on various types of loads or use conditions (for example, the execution unit 20a and the re-execution unit 20d can be implemented as one unit). The processing procedures, the control procedures, specific names, various data, and information including parameters described in the above embodiments or illustrated in the drawings (for example, FIGS. 2, 10, etc.) can be changed as appropriately unless otherwise specified.

Computer Program

The processes described in the above embodiments are performed when a computer system, such as a personal computer and a work station, executes predetermined computer programs. An example of a computer system is described in the following that executes computer programs, thereby implementing the same functions as in the above embodiments.

Computer System that Executes the Thermal-Fluid-Simulation Analysis Program

Figure 14:
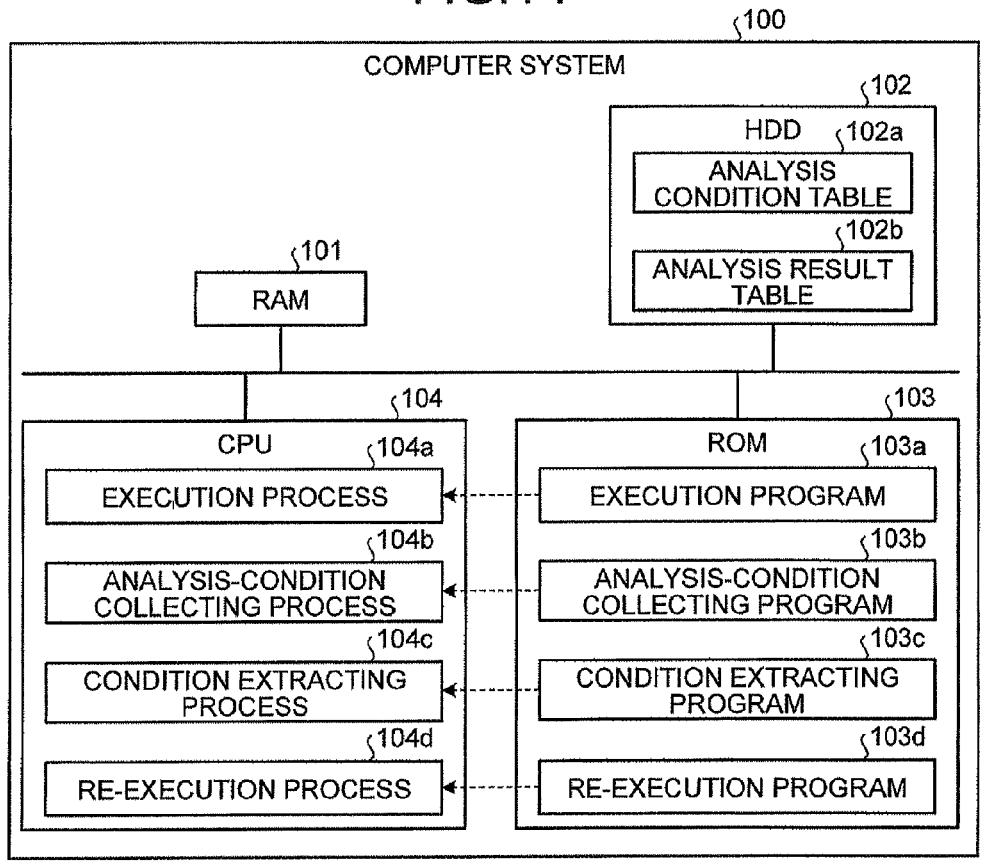
FIG. 14 is a block diagram of an example of a computer system that executes a thermal fluid simulation analysis program.
Figure 15:
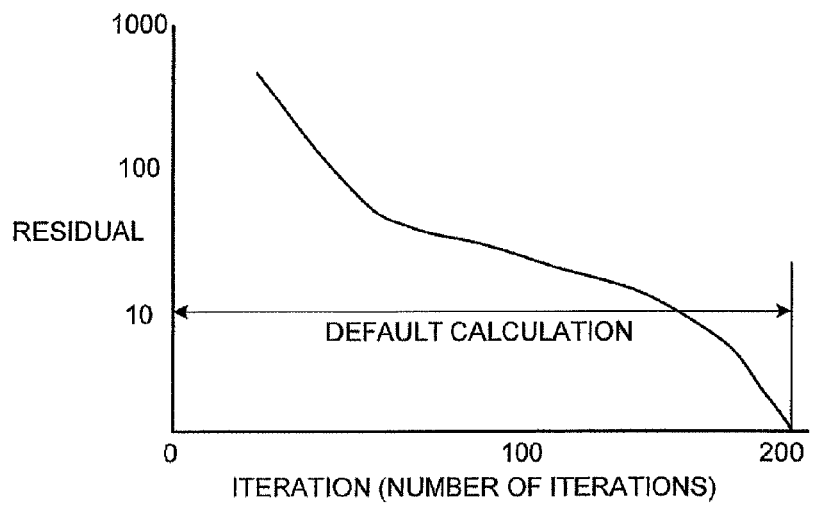
FIG. 15 is a graph of an example of a convergence curve when a conventional thermal fluid simulation analysis is conducted.

FIG. 14 is a block diagram of an example of a computer system that that executes a thermal-fluid-simulation analysis program. As illustrated in FIG. 14, a computer system 100 includes a RAM 101, an HDD 102, a ROM 103, and a CPU 104. The ROM 103 prestores therein computer programs that are used to implement the same functions as those of the above embodiments. More particularly, as illustrated in FIG. 14, an execution program 103a, an analysis-condition collecting program 103b, a condition extracting program 103c, and a re-execution program 103d are prestored in the ROM 103.

The CPU 104 reads and executes these computer programs 103a to 103d. Then, as illustrated in FIG. 14, an execution process 104a, an analysis-condition collecting process 104b, a condition extracting process 104c, and a re-execution process 104d are implemented, respectively. It is noted that the execution process 104a corresponds to the execution unit 20a illustrated in FIG. 1, and the analysis-condition collecting process 104b corresponds to the analysis-condition collecting unit 20b. The condition extracting process 104c corresponds to the condition extracting unit 20c and the re-execution process 104d corresponds to the re-execution unit 20d.

The HDD 102 has an analysis condition table 102a and an analysis result table 102b. The analysis condition table 102a contains the analysis conditions and is used for generating the analysis model. The analysis result table 102b contains simulation results. The analysis condition table 102a corresponds to the analysis condition DB 15a illustrated in FIG. 1, and the analysis result table 102b corresponds to the analysis result DB 15b.

It is noted that the above-described computer programs 103a to 103d need not be stored in the ROM 103. For example, they can be stored in a "portable physical medium" insertable to the computer system 100, such as a flexible disk (FD), a CD-ROM, an MO disk, a DVD disk, a magnetic optical disk, or an IC card. Alternatively, they can be stored in a "stationary physical medium" such as an internal or external hard disk drive (HDD) of the computer system 100. Alternatively they can be stored in "another computer system" that is connected to the computer system 100 via the public line, the Internet, a LAN, a WAN, or the like. The computer system 100 reads the computer programs from the media and the external computer system and executes the read computer programs.

According to an embodiment of a thermal-fluid-simulation analyzing apparatus disclosed in the present application, the time taken is decreased for a thermal fluid simulation that is performed to analyze the air-conditioning state and thus a quick analysis of the current situation is enabled.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A thermal-fluid-simulation analyzing apparatus comprising:
 a processor coupled to a memory,
 wherein the processor is programmed to analyze thermal fluid simulation by:
 generating an analysis model and dividing the analysis model into meshes using analysis conditions and conducting a first thermal fluid simulation analysis in a first region based on the generated analysis model, the analysis condition being a condition in a thermal fluid simulation analysis according to which an air conditioning state in a predetermined space is simulated;
 extracting an actual measured value as a boundary condition when an alarm is generated after the first thermal fluid simulation analysis, the boundary condition being an analysis condition that corresponds to a portion for which the alarm is generated; and
 selecting a region, different from the first region, corresponding to the boundary condition extracted in the extracting from regions in the meshes of the analysis model generated, updating the selected region with the boundary condition, and conducting a second thermal fluid simulation analysis using the analysis model and the meshes in which the selected region is updated.

2. The thermal-fluid-simulation analyzing apparatus according to claim 1, wherein
 the memory stores a correspondence between a type of the alarm and an item to be re-defined among the analysis condition, and
 the extracting extracts an actual measured value corresponding to an item to be re-defined corresponding to the generated alarm.

3. The thermal-fluid-simulation analyzing apparatus according to claim 1, wherein the selecting creates a comparison result, the comparison result being created by comparing a simulation result given by the first thermal fluid simulation analysis with a simulation result given by the second thermal fluid simulation analysis.

4. The thermal-fluid-simulation analyzing apparatus according to claim 1, wherein the processor further executes detecting a temperature or an air volume in the predetermined space, wherein the selecting compares the temperature or the air volume detected in the detecting with a corresponding simulation result given by the thermal fluid simulation analysis and, if a result of the comparison is higher than a predetermined threshold, notifies an occurrence of a problem as the alarm.

5. The thermal-fluid-simulation analyzing apparatus according to claim 1, wherein the selecting conducts the second thermal fluid simulation analysis only on an analysis condition updated according to the boundary condition.

6. A thermal-fluid-simulation analyzing method, performed by a computer, comprising:

generating an analysis model and dividing the analysis model into meshes using analysis conditions and conducting a first thermal fluid simulation analysis in a first region based on the generated analysis model, the analysis condition being a condition in a thermal fluid simulation analysis according to which an air conditioning state in a predetermined space is simulated;

extracting an actual measured value as a boundary condition when an alarm is generated after the first thermal fluid simulation analysis, the boundary condition being an analysis condition that corresponds to a portion for which the alarm is generated; and selecting a region, different from the first region, corresponding to the boundary condition extracted in the extracting from regions in the meshes of the analysis model generated, updating the selected region with the boundary condition, and conducting a second thermal fluid simulation analysis using the analysis model and the meshes in which the selected region is updated.

7. A non-transitory computer readable storage medium having stored therein a thermal-fluid-simulation analyzing program, the program causing a computer to execute a process comprising:

generating an analysis model and dividing the analysis model into meshes using analysis conditions and conducting a first thermal fluid simulation analysis in a first region based on the generated analysis model, the analysis condition being a condition in a thermal fluid simulation analysis according to which an air conditioning state in a predetermined space is simulated;

extracting an actual measured value as a boundary condition when an alarm is generated after the first thermal fluid simulation analysis, the boundary condition being an analysis condition that corresponds to a portion for which the alarm is generated; and selecting a region, different from the first region, corresponding to the boundary condition extracted in the extracting from regions in the meshes of the analysis model generated, updating the selected region with the boundary condition, and conducting a second thermal fluid simulation analysis using the analysis model and the meshes in which the selected region is updated.

* * * * *